April 23, 1968  R. LOOSJES ET AL  3,379,804
METHOD OF THE PRODUCTION OF A BODY FROM A SLIP IN A POROUS MOLD
Filed June 7, 1965

INVENTORS
ROBERT LOOSJES
BERNARDUS J. M. MAAS
BY
ATTORNEYS

United States Patent Office 3,379,804
Patented Apr. 23, 1968

3,379,804
METHOD OF THE PRODUCTION OF A BODY FROM A SLIP IN A POROUS MOLD
Robert Loosjes, Maastricht, and Bernardus J. M. Maas, Heer, Netherlands, assignors to N.V. Koninklijke Sphinx-Ceramique v/h Petrus Regout, Maastricht, Netherlands, a Dutch limited-liability company
Filed June 7, 1965, Ser. No. 461,914
Claims priority, application Netherlands, June 10, 1964, 64—6,543
1 Claim. (Cl. 264—87)

The invention relates to a method of producing a body from a slip in a porous mold. In a method of this kind the slip was hitherto cast in plaster molds. As a result of the capillary action of the fine pores, the moisture is drawn from the slip into the mold wall via the relative coarse pores, a body building up on the wall of the mold. The disadvantage of this method is that the building up of the body is a very slow process and hence a considerable amount of space is occupied because of the large quantity of molds required for normal manufacture. The object of the invention is to provide a method whereby casting is speeded up so that a smaller number of molds is required.

To this end, according to the invention, pressure is applied to the slip and to the porous mold on all sides. The body will now build up more quickly because of the higher pressure. Since the process is no longer dependent solely on the capillary absorption of the mold wall, the molds can now be made from other porous materials of lower absorption than plaster.

According to the invention, those parts of the surface of the porous mold on which the body is not required to be built up may be covered with a water-impermeable layer, whereafter the mold is completely immersed in the slip and the latter is then pressurised. Another advantage of this process is that the material of the mold is under pressure on all sides so that the magnitude of the pressure is less dependent upon the thickness of the mold. Since the air contained in the wall is compressed, this air expands to some extent when the pressure applied to the slip is relaxed and this assists the release of the body from the mold.

According to the invention, an adhesive plastic material can be used for partially covering the surface of the mold. The sealing layer must seal off the mold wall satisfactorily since otherwise there may be a local build-up of the body. The adhesion of the sealing layer must also be very good, since otherwise the expanding air in the mold wall could press the layer away on relaxation of the pressure.

According to the invention, to produce a pressure on the mold in all directions, the outside of the mold may be enclosed in a recessed bag of flexible material which abuts those surfaces on the mold on which the body is not required to be built up and which is supported by a supporting structure, and the bag and the slip in the mold can be simultaneously pressurised, the pressure in the bag being at least equal to the pressure on the slip. In that case the mold does not have to be immersed in the slip. The mold can then be filled in the normal way. Nor does the mold have to be provided with an adhesive plastics material in that case.

The invention also relates to apparatus for performing one of the above methods. Such apparatus may comprise a tank for the slip, such tank being provided with a sealing lid and connections for pressurising the contents of the tank and release of the pressure, and means for the supply and discharge of slip.

The apparatus may also consists of a tank containing one or more bags of flexible material provided with a connection for the supply of pressure medium, such bags being adapted to fit in the tank and having one or more recesses to receive a porous mold, the tank being provided with one or more pipes for the supply and discharge and pressurisation of the slip, such pipes being taken through the walls of the bag and extending into the associated mold.

The invention also relates to a mold of porous material for use with the method described for the same. According to the invention, part of the surface of such a mold is provided with an impermeable layer.

The invention will be explained in detail in the following description of one example of embodiment of an apparatus according to the invention.

Figure 1:
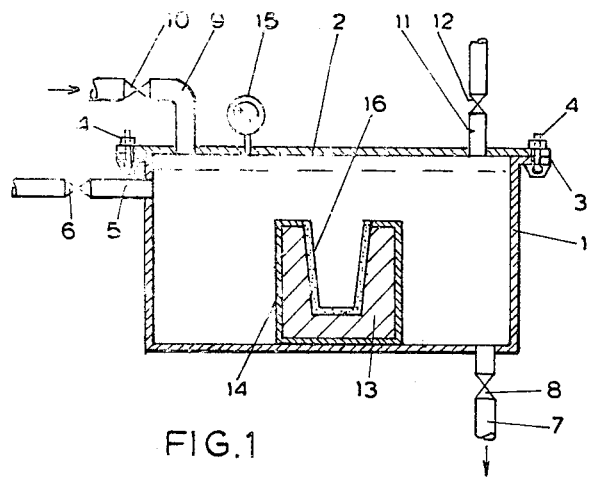
FIG. 1 is a diagrammatic cross-section of an apparatus according to the invention.

A tank 1 has a lid 2 which by means of flanges 3 and toggles 4 can be secured to the tank so as to seal the same. The tank 1 has a feed pipe 5 containing a valve 6 for the supply of slip to the tank. The bottom of the tank is provided with a discharge pipe 7 for the slip, such pipe containing a valve 8. The lid 2 also has a pipe 9 connected to a pressure source. This pipe contains a valve 10. The lid 2 also has a pipe 11 containing a valve 12. Pipe 11 leads freely to atmosphere. A mold 13 of porous material is disposed in the tank 1. The outer wall and top edge of this mold are provided with a sealing layer 14 which, for example, may consist of "Naftoflex." A pressure gauge 15 is also provided on the lid 2 to indicate the pressure in the tank 1.

The following procedure may be adopted, for example, in performance of the method according to the invention. The mold 13 of porous material is placed in the tank, the outside of the mold being covered by the layer 14. The lid 2 is closed, the valve 10 being closed and the valve 12 open. The tank is then filled with slip to the required height via the pipe 5 with the valve 8 closed. Valve 6 is then closed and pressure is then applied above the slip via pipe 9 after valve 12 has been closed. Under the influence of the pressure a body 16 will rapidly build up on the permeable inner wall of the mold. As soon as the body 16 has attained the required thickness, the valve 10 is closed and the slip is dicharged via the pipe 7. The pressure is allowed to escape via the valve 12 which establishes communication between the interior of the tank and atmosphere. After removal of lid 2, the mold 13 can be removed from the tank 1. It should also be pointed out that pressure can be applied to the slip via the pipe 5. The pipe 9 with the valve 10 can then be eliminated.

Of course, in a practical embodiment of the apparatus according to the invention a large number of molds will be placed in one tank. There is no need to empty the tank after each casting operation. The molds 13 can also be removed from the tank when the latter is full.

Figure 2:
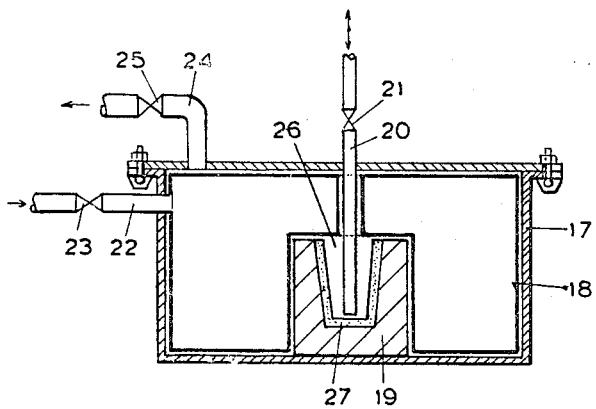
FIG. 2 is a similar cross-section to FIG. 1 showing another embodiment of the apparatus.

In the embodiment shown in FIG. 2, a tank 17 contains a flexible bag 18 with a recess into which a porous mold 19 fits. A pipe 20 containing a valve 21 extends into the mold 19. Pressure medium can be fed to the bag 18 via a pipe 22 containing a valve 23. The lid of the tank 17 contains a venting pipe 24 with a valve 25.

The mold 19 is filled with slip 26 via the pipe 20. When the mold is full, pressure is applied to the bag 18 via the pipe 22, the slip 26 also being pressurised to a slightly lower pressure via the pipe 20. A body 27 then rapidly builds up in the mold 19. As soon as the body 27 has reached the required thickness, the excess slip can be discharged from the mold via the pipe 20. After the pressure has been released from the bag 18 the lid can be removed from the tank 17 and the mold 19 removed there-from. During pressurisation of the bag 18 the air can escape from the tank 17 via the pipe 24. When the bag has been pressurised, the bag seals off those surfaces of the mold on which no body is required to be built up, and also provides a seal around the pipe 20.

The method according to the invention is particularly suitable for automation. Since setting times can be accurately controlled with automation, a very quick-setting slip may be used. Casting times as low as one minute can be attained, for example in the case of small articles, such as pieces of crockery. A conventional time is 15 minutes. In the case of vitreous china articles, the casting time can be reduced from 90 minutes to 10 minutes.

What we claim is:

1. The method of producing a body from a slip in a porous mold, comprising providing a porous mold cavity having a mold portion conforming to the shape of the body to be produced, sealing the surfaces of said mold other than the surfaces of said cavity portion with a fluid impermeable layer, subjecting all surfaces of said mold to substantially uniform pressure including subjecting said mold portion to a slip under pressure to build up a body on said cavity portion surfaces conforming to the shape thereof and compressing air within the body of the mold, and releasing the pressure on said mold including withdrawing said slip to enable the compressed air within the body of the mold to expand toward the cavity portion surfaces to separate the built up body from the cavity portion surfaces.

References Cited

UNITED STATES PATENTS

| | | | |
|---|---|---|---|
| 3,243,860 | 4/1966 | Whittaker | 264—87 |
| 2,303,303 | 11/1942 | Schleicher | 264—86 |
| 1,337,663 | 4/1920 | Lawrence | 264—86 |
| 3,066,069 | 11/1962 | Ednell | 264—87 X |
| 2,221,794 | 11/1940 | Gould | 264—86 |
| 1,177,240 | 3/1916 | Gates | 264—314 |

ROBERT F. WHITE, *Primary Examiner.*

R. B. MOFFITT, *Assistant Examiner.*